US011341339B1

(12) United States Patent
Li et al.

(10) Patent No.: US 11,341,339 B1
(45) Date of Patent: May 24, 2022

(54) CONFIDENCE CALIBRATION FOR NATURAL-LANGUAGE UNDERSTANDING MODELS THAT PROVIDES OPTIMAL INTERPRETABILITY

(71) Applicant: Amazon Technologies, Inc., Seattle, WA (US)

(72) Inventors: Shang-Wen Daniel Li, Jersey City, NJ (US); Meghana Puvvadi, Seattle, WA (US); Trevor Andrew Morse, Seattle, WA (US); Roger Scott Jenke, Seattle, WA (US); Yi Zhang, Sammamish, WA (US); Rama Krishna Sandeep Pokkunuri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 58 days.

(21) Appl. No.: 16/874,582

(22) Filed: May 14, 2020

(51) Int. Cl.
| | |
|---|---|
| *G06F 15/00* | (2006.01) |
| *G10L 15/00* | (2013.01) |
| *G10L 13/00* | (2006.01) |
| *G10L 13/06* | (2013.01) |
| *G06F 40/40* | (2020.01) |

(52) U.S. Cl.
CPC .................................. *G06F 40/40* (2020.01)

(58) Field of Classification Search
CPC .......... G06F 30/27; G06F 40/00; G06F 40/20; G06F 40/40
USPC .................................... 704/9, 257, 261, 266
See application file for complete search history.

(56) References Cited

U.S. PATENT DOCUMENTS

| | | | | |
|---|---|---|---|---|
| 9,779,085 | B2 * | 10/2017 | Wick | G06F 40/242 |
| 10,331,791 | B2 * | 6/2019 | Anbazhagan | G06F 8/30 |
| 10,372,819 | B2 * | 8/2019 | Bufe | G06F 40/30 |
| 10,713,438 | B2 * | 7/2020 | Bufe | G06F 40/30 |
| 10,896,679 | B1 * | 1/2021 | Hu | G06N 3/08 |
| 2007/0143099 | A1 * | 6/2007 | Balchandran | G10L 15/18 |
| | | | | 704/9 |
| 2014/0223284 | A1 * | 8/2014 | Rankin, Jr. | G06F 40/186 |
| | | | | 715/234 |
| 2016/0042748 | A1 * | 2/2016 | Jain | G10L 15/22 |
| | | | | 704/9 |
| 2016/0162456 | A1 * | 6/2016 | Munro | G06F 40/137 |
| | | | | 704/9 |
| 2016/0283851 | A1 * | 9/2016 | Bufe | G06N 5/045 |
| 2016/0300154 | A1 * | 10/2016 | Bufe | G06F 40/284 |
| 2018/0143967 | A1 * | 5/2018 | Anbazhagan | G10L 15/183 |
| 2018/0157638 | A1 * | 6/2018 | Li | G06N 3/08 |

(Continued)

*Primary Examiner* — Khai N. Nguyen
(74) *Attorney, Agent, or Firm* — Nicholson De Vos Webster & Elliott LLP

(57) ABSTRACT

Techniques for creating and calibrating natural-language understanding (NLU) machine learning models are described. In certain embodiments, a training service tunes parameters of a function, taking the output from an NLU machine learning model as an input of the function, to calibrate the NLU machine learning model's output to optimize the interpretability of the resulting output, e.g., confidence score(s). Embodiments herein include generating, by the NLU machine learning model, an output based at least in part on an input (e.g., utterance) from a user, and applying a tuned, output modifying function to the output from the NLU machine learning model to generate a modified output. An inference may be generated based at least in part on the modified output.

20 Claims, 11 Drawing Sheets

(56) References Cited

U.S. PATENT DOCUMENTS

| | | | |
|---|---|---|---|
| 2019/0325863 A1* | 10/2019 | Martin | G06N 3/08 |
| 2020/0194098 A1* | 6/2020 | Hannigan | G06N 3/0454 |
| 2021/0042800 A1* | 2/2021 | Chandra | G06Q 30/0281 |
| 2021/0073377 A1* | 3/2021 | Coull | G06N 3/08 |

* cited by examiner

CONFIDENCE CALIBRATION FOR
NATURAL-LANGUAGE UNDERSTANDING
MODELS THAT PROVIDES OPTIMAL
INTERPRETABILITY

BACKGROUND

Enterprises are generating and utilizing more data than ever before. Trying to determine what data is relevant from that data is a non-trivial task. Traditional solutions rely on keyword-based document analysis to find specific terms in the data which is a general-purpose approach inherently limited by its inability to "understand" the content at a more granular level.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for creating and calibrating natural-language understanding (NLU) machine learning (ML) models. According to some embodiments, a training service tunes parameters of a function, taking output from an NLU ML model as an input of the function, to calibrate the NLU ML model's output to optimize the interpretability of the resulting output (e.g., confidence score(s)). Embodiments herein include generating, by the NLU ML model, an output based at least in part on an input (e.g., utterance) from a user, and applying a tuned, output modifying function to the output from the NLU machine learning model to generate a modified output (e.g., confidence score). An inference may be generated based at least in part on the modified output. In certain embodiments, an interpretable confidence score is essential for a satisfactory customer experience. In one embodiment, confidence scores aim to indicate how confident an NLU model is with the prediction of user intention (e.g., the intent) for a given query (e.g., utterance). In embodiments, interpretable confidence scores allow (e.g., a customer of a provider network) to build reliable business logics for their applications (e.g., a chatbot). Example use cases include error recovery, disambiguation, and establishing natural conversations with users.

As discussed in further detail below, embodiments herein may utilize the following: (1) define a sigmoid function characterized by calibration parameters to map a raw model prediction output (e.g., logit(s)) into calibrated scores, (2) at the training phase, tune the calibration parameters to optimize a loss function which quantifies the interpretability of resulting scores (e.g., based on a trade-off between in domain and out of domain intent classification), and (3) apply the sigmoid function along with the tuned parameters at inference time to the NLU model output to obtain calibrated confidence scores. In certain embodiments, a confidence booster (e.g., using score modifying rule(s)) is utilized on top of the calibrated (e.g., turn-level) scores, e.g., to further improve the interpretability for conversations with slot filling. In one embodiment of the booster, the scores are modified (e.g., boosted or lowered) based on scores in a previous dialog turn(s) and/or the number of slot types which have been mentioned in the history of the dialog. Thus, the embodiments herein allow an NLU model's raw output to be calibrated for obtaining scores which yield optimal interpretability. In one embodiment, metrics based on expected calibration error (ECE) are tracked to measure the performance of calibration, e.g., to verify that the utilized approach outperforms the original NLU model's output.

Figure 1:
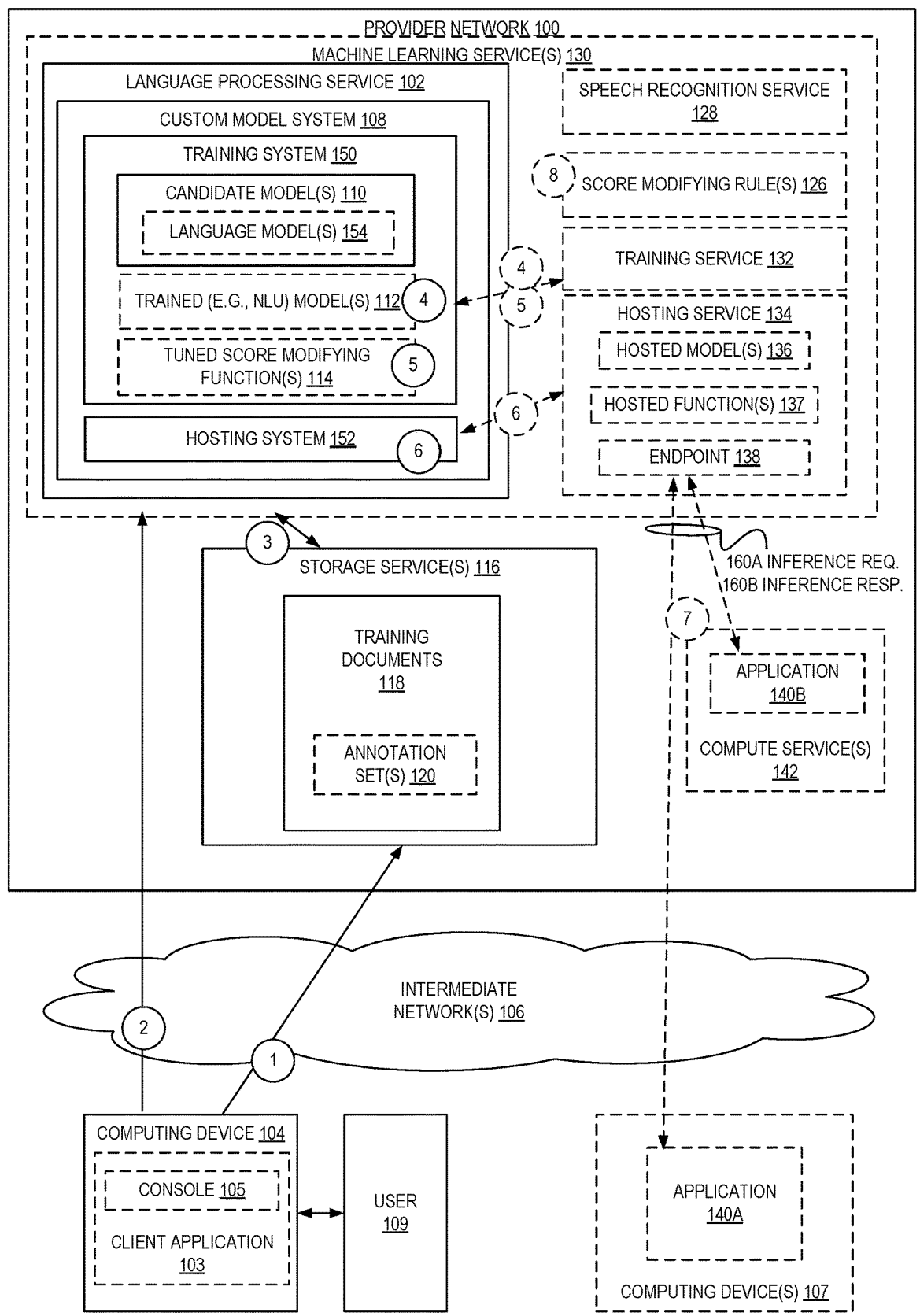
FIG. 1 is a diagram illustrating an environment for creating, training, and using a machine learning model according to some embodiments.

FIG. 1 is a diagram illustrating an environment for creating, training, and using a machine learning model according to some embodiments. FIG. 1 includes a language processing service 102, one or more storage services 116, one or more machine learning services 130, and one or more compute services 142 implemented within a multi-tenant provider network 100. Each of the language processing service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The language processing service 102, in some embodiments, is a machine learning powered service that makes it easy for users to understand, find insights in, and identify relationships in text. For example, users may use the language processing service 102 to analyze text-based content such as customer emails, support tickets, product reviews, call center conversations, social media posts, etc., which contain useful information but are typically unstructured and messy, making it challenging for users to independently extract relevant and meaningful insights at scale. The language processing service 102, in some embodiments, can address this problem using natural language processing (NLP) techniques to automatically identify the language of the text, extract key phrases, places, people, brands, or events; understand positive or negative sentiment; and/or automatically organize a collection of text files by topic. In some embodiments, the language processing service 102— via use of a custom model system 108—allows users to build and use model(s) 112 and tuned, score modifying function(s) 114. In certain embodiments, the NLP techniques include natural-language understanding (NLU) techniques, e.g., NLU machine learning (ML) models. In one embodiment, NLU techniques allow a machine to comprehend text from a human user, for example, to "understand" a request from the human user. The custom model system 108, for example, may enable users to generate model(s) 112 and/or tuned, score modifying function(s) 114 that allows the language processing service 102 to identify an intent, e.g., specific to the user's domain. A domain may generally refer to a set of computers that are accessed and administered with a common set of rules. The custom model system 108 may obtain, from a user 109, a relatively small set of examples (for example, annotation set(s) 120, e.g., that includes a set of utterances mapped to the intents and slots expected as output, which may also include respective confidence scores for the output(s)), and then train a (e.g., NLU) model 112 to recognize similar terms (e.g., in utterances) in any other block of text and provide an expected intent and/or slot names/values, without requiring the user 109 to manage servers, implement particular algorithms, etc.

For example, a user 109 (e.g., working for an online travel agency) may wish to set up an application (e.g., chatbot) to interact with their end-users to allow for the booking of a flight. The user 109 may provide annotation set 120 that includes a set of utterances (e.g., phrases) mapped to intent(s) (e.g., an action that fulfills the utterance). Intents may include a plurality of arguments that may be generally referred to as slots. Continuing with the booking of the flight example, an annotation set 120 may include respective sets of: an utterance, an expected intent for that utterance, expected slot names, and/or expected slot values. For example, an utterance may be "I want to fly from Seattle to New York", the expected intent may be "Book a flight" and the expected slot names may include "departure airport", "departure day", "departure time", "arrival airport", "arrival day", "arrival time", or any combination thereof, and may include example slot values accordingly.

The custom model system 108, for example, may additionally or alternatively enable users to build model(s) 112 and/or tuned, score modifying function(s) 114 using their domain (or business) specific training documents 118 without needing to manage servers, understand ML techniques, etc. With output from model(s) 112 and/or tuned, score modifying function(s) 114, users may thus easily build applications with highly engaging user experiences and lifelike conversational interactions.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 109 may provide or otherwise identify training documents 118 (e.g., annotation set(s) 120) for use in creating model(s) 112 and their tuned, score modifying function(s) 114.

In certain embodiments, training a model (e.g., train an algorithm into a model) is a time and resource intensive process. Thus, it may be desirable to modify the output generated by a trained model 112 without performing another training iteration of the model itself. In certain embodiments herein, a function (e.g., a sigmoid function) is selected and trained (e.g., by adjusting the function's parameters without modifying the model), and the tuned output modifying function (e.g., tuned score modifying function 114) is utilized to modify (e.g., raise or lower) the output of the trained model 112. These embodiments decouple the selecting and/or training of the output modifying function from the (earlier) training of the (e.g., NLU) model. Thus, a user can finetune (e.g., based on in domain data) the function 114 (e.g., through multiple training iterations) without modifying an existing model or generating another model, e.g., to better fit the output from the model, input into the function, into a modified output from the function. This allows for finetuning of the function 114 to create a modified output from the function (the function taking an output of the model as the function's input) that is better calibrated than the unmodified output from the model. In one embodiment, the function is a sigmoid function that has one or more parameters that are tunable to modify the output(s) from a model into a modified output. A sigmoid function may have a generally "S" shaped curve. A sigmoid function may map its inputs (e.g., taking its input(s) as output(s) from a model) to a (e.g., smaller) range of values (e.g., a range of 0 to 1 or a range of −1 to 1). A sigmoid function may be a bounded, differentiable, real function that is defined for all real input values and has a non-negative derivative at each point.

As one example use, as shown at circle (1), the user 109 may utilize a client application 103 executed by a computing device 104 (e.g., a web-application implementing a console 105 for the provider network 100, a standalone application, another web-application of another entity that utilizes the language processing service 102 as a part of its backend, a database or mixed-SQL environment, etc.) to cause the computing device 104 to upload the training documents 118 to a storage location (e.g., provided by a storage service 116 such as an object storage service of a provider network 100).

The dataset 122 may be an annotation set(s) 120, for example, including any of: utterances (e.g., spoken or typed phrases of input), slots (e.g., words or phrases within the utterance that are used to represent variable information), time and day (e.g., timestamp) for generation/receipt of the utterance, and the resulting intent(s) (e.g., representing an action that fulfills the utterance). The training documents 118 may be a columnar dataset that includes rows (or entries) of data values, where the data values may be arranged according to one or more columns (or attributes) and may be of a same datatype (e.g., one storing text). In some cases, the training documents 118 includes headings or other metadata describing names or datatypes of the columns, though in some cases this metadata may not exist. For example, some or all of the training documents 118 may have been provided by a user as a plaintext file (e.g., a comma-separated values (CSV) or tab-separated values (TSV) file), an exported database table or structure, an application-specific file such as a spreadsheet, etc. For example, some or all of the training documents 118 may have been provided by a user in a JavaScript Object Notation (JSON) format.

Thereafter, at circle (2) the computing device 104 may issue one or more requests (e.g., API calls) to the language processing service 102 that indicate the user's 109 desire to train a model(s) 112 (e.g., and, explicitly or implicitly, to train (or retrain) a tuned, score modifying function(s) 114). The request may be of a type that identifies which type of model is to be created, e.g., CreateModel for creating a trained model 112, CreateFunction for creating a tuned, score modifying function 114, etc. The request may also include one or more of an identifier of a storage location or locations storing the training documents 118 (e.g., an identifier of annotation set(s) 120), which may identify a storage location (e.g., via a Uniform Resource Locator (URL), a bucket/folder identifier, etc.) within the provider network 100 (e.g., as offered by a storage service 116) or external to the provider network 100, a format identifier of the training documents 118, a language identifier of the language of the training documents 118, etc. In some embodiments, the request includes the annotation sets 120 within the request.

Responsive to receipt of the request, the custom model system 108 of the language processing service 102 is invoked and begins operations for training the corresponding type of model. For example, the custom model system 108 may identify what type of model is to be trained (e.g., via analyzing the method call associated with the request), the storage location(s) associated with the training documents 118, etc. Thus, the custom model system 108 may retrieve any stored training documents 118 (e.g., annotation set 120) as shown at circle (3), which may be from a storage location within the provider network 100 or external to the provider network 100.

In some embodiments, the training (at circle (4)) of the model(s) 112 includes use (at optional, dotted circle (4)) of a separate training service 132 of a machine learning service 130 described later herein to perform a particular training job or hyperparameter optimization tuning job for a model, or the like; the training (at circle (5)) of a score modifying function(s) 114 includes use (at optional, dotted circle (5)) of a separate training service 132 of a machine learning service 130 described later herein to perform a particular training job or parameter optimization tuning job for a function, or the like; similarly, the hosting system 152 of the custom model system 108 may make use (at optional, dotted circle (6)) of a hosting service 134 of a machine learning service 130 to deploy a model as a hosted model 136 and a hosted function 137 in association with an endpoint 138 that can receive inference requests from client applications 140A and/or 140B at circle (7), provide the inference requests 160A to the associated hosted model(s) 136 and hosted function(s) 137, and provide inference results 160B (e.g., predicted intent, predicted action, etc.) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100. Candidates model(s) 110 may include a language model(s) 154, e.g., an NLU model. In certain embodiments, a function (e.g., calibration function) (e.g., function 114) is separate from a model (e.g., model 112) (e.g., the function is not a layer of the model and/or the parameters of the function are (e.g., entirely) different than the parameters of the model). In certain embodiments, a function (e.g., calibration function) (e.g., function 114) is trained separately from the training of the model (e.g., model 112), for example, function tuning system 310 being separate from model training system 210. In certain embodiments, function 114 includes (e.g., significantly) fewer parameters than the parameters in model 112.

In some embodiments, the custom model system 108 may further use score modifying rule(s) 126, as reflected by optional circle (8), e.g., that use a threshold score to boost or lower the scores output by score modifying function(s) 114. The score(s) may be used to provide an inference, e.g., as part of a chatbot or other application of a user.

In certain embodiments, a speech recognition service 128 is included to convert spoken phrases to text, e.g., to convert a spoken utterance to text.

Figure 2:
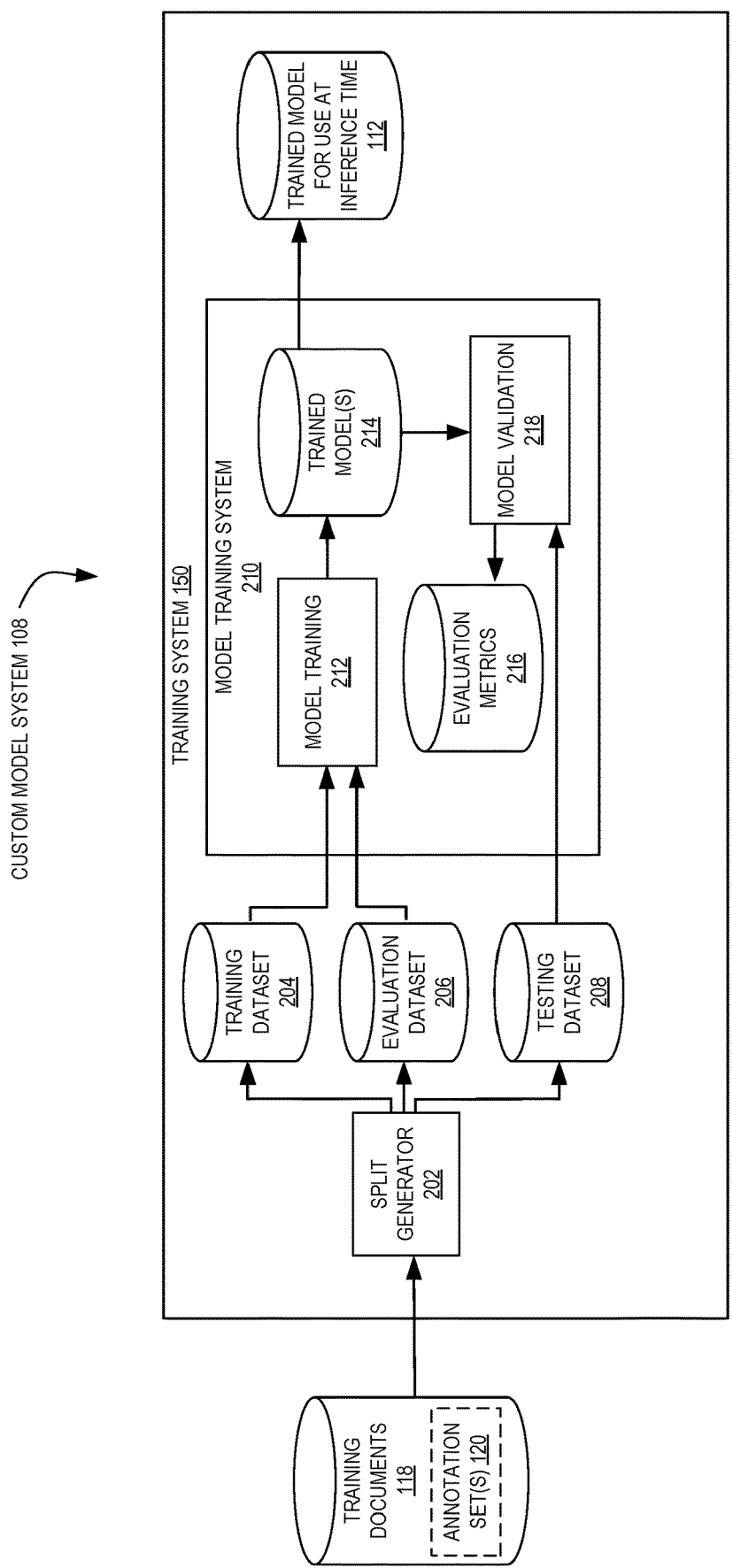
FIG. 2 is a diagram illustrating a custom model system that includes model training according to some embodiments.

FIG. 2 is a diagram illustrating a custom model system 108 that includes model training according to some embodiments. Custom model system 108 includes a training system 150 to train one or more ML models, for example, to train a ML model to provide an intent for an utterance by a user (e.g., an end-user of user 109 in FIG. 1). Depicted training system 150 includes a model training system 210. In certain embodiments, model training system 210 includes a model training 212 system/service to train a ML model on a training dataset 204 (e.g., of training documents 118) (e.g., with a set of hyperparameters of that ML model), evaluate the performance of that model (e.g., at generating n intent for an utterance and optionally, its slots) on an evaluation dataset 206 (e.g., of different training documents 118), and adjust the (e.g., hyperparameters of that) model to generate a trained model 214. In certain embodiments, model validation 218 is performed on a trained model 214 with the testing dataset 208 (e.g., of different training documents 118) and that model is given a score (e.g., based at least in part on the generated evaluation metrics 216). This may be repeated for various hyperparameters and/or model types (e.g., algorithms) When a (e.g., predetermined) threshold score is exceeded by the score for a certain model, the model training system 210 may send that trained model 112 to be used at inference time. In one embodiment, a plurality of model training system 210 instances are executed in parallel, e.g., such that the model that takes the longest to be trained is assigned the lowest score. The term "hyperparameter" may generally refer to a configuration value that is external to a model and whose value cannot be readily determined from data (e.g., a hyperparameter being a value used to control the learning process), for example, differing from a model parameter whose value (e.g., node weight) can be determined from the data (e.g., a model parameter is learned during training).

In certain embodiments, split generator 202 splits the plurality of training documents 118 into a first proper subset as a training dataset 204, a second proper subset as an evaluation dataset 206, and a third proper subset as a testing dataset 208. One example of a split is 80%, 10%, and 10% for training dataset 204, evaluation dataset 206, and testing dataset 208, respectively, although any other split may be utilized in certain embodiments.

Figure 3:
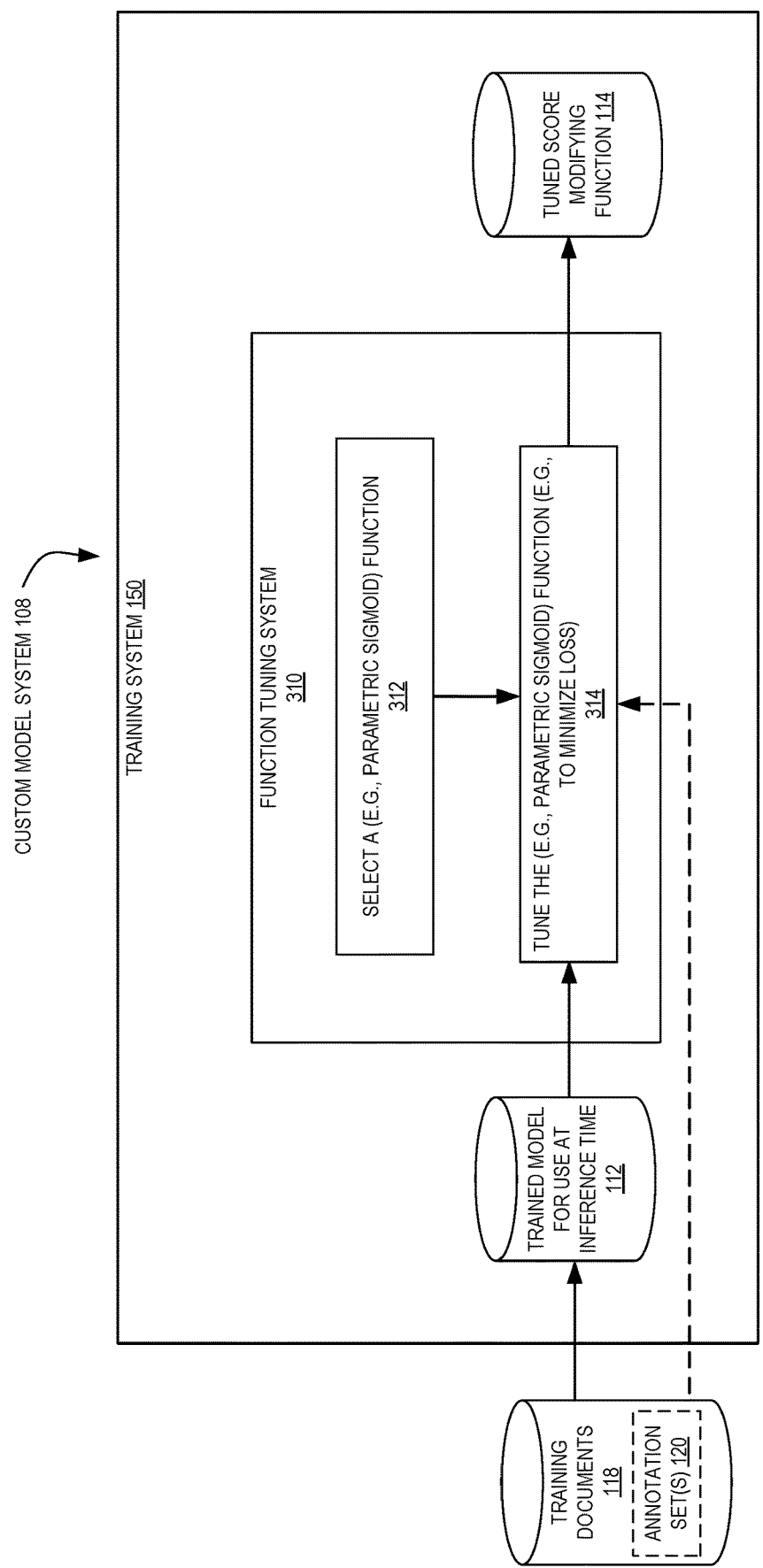
FIG. 3 is a diagram illustrating a custom model system that includes function tuning according to some embodiments.

FIG. 3 is a diagram illustrating a custom model system 108 that includes function tuning according to some embodiments. Custom model system 108 includes a training system 150 to train one or more functions, for example, to train a function to modify the confidence score(s) of an intent (e.g., from an ML model) for an utterance by a user (e.g., an end-user of user 109 in FIG. 1). Depicted training system 150 includes a function tuning system 310. In certain embodiments, function tuning system 310 includes a system/service to select a (e.g., parametric sigmoid) function 312 to modify an output (e.g., score) for a model, and a system/service to tune the (e.g., parametric sigmoid) function 314, e.g., to minimize loss. In one embodiment, function tuning system 310 selects a (e.g., parametric sigmoid) function 312 (e.g., from a plurality of candidate functions) based on the function being differentiable (e.g., capable of learning errors) for the trained model's 112 output and/or based on the function having (e.g., significantly) fewer parameters than the trained model 112 (e.g., the function having less than about 2, 3, 4, 5, 6, 7, 8, 9, 10, 11, etc. parameters total). In one embodiment, function tuning system 310 is to receive an output (e.g., an intent) from a trained model 112 receiving as its input training documents 118 (for example, one or more annotation sets 120, e.g., utterances thereof), and tune the parameters of the function (for example, based on the expected output (e.g., intent) from annotation set 120). In one embodiment, function tuning system 310 (e.g., at block 314) repeatedly tunes a (e.g., same) score modifying function to the model output (e.g., confidence score thereof) from a single model 112, for example, based on a request(s) to retune the tuned score modifying function 114, e.g., in response to the tuned score modifying function 114 performing less than a threshold value and/or function tuning system 310 receiving additional training documents 118. In one embodiment, the function tuning system 310 is to tune at 314 the calibration parameters to optimize a loss function which quantifies the interpretability of resulting confidence scores based on trade-off between in domain and out of domain intent classification. The tuned output (e.g., score) modifying function 114 may then be used for an inference, etc.

Figure 4:
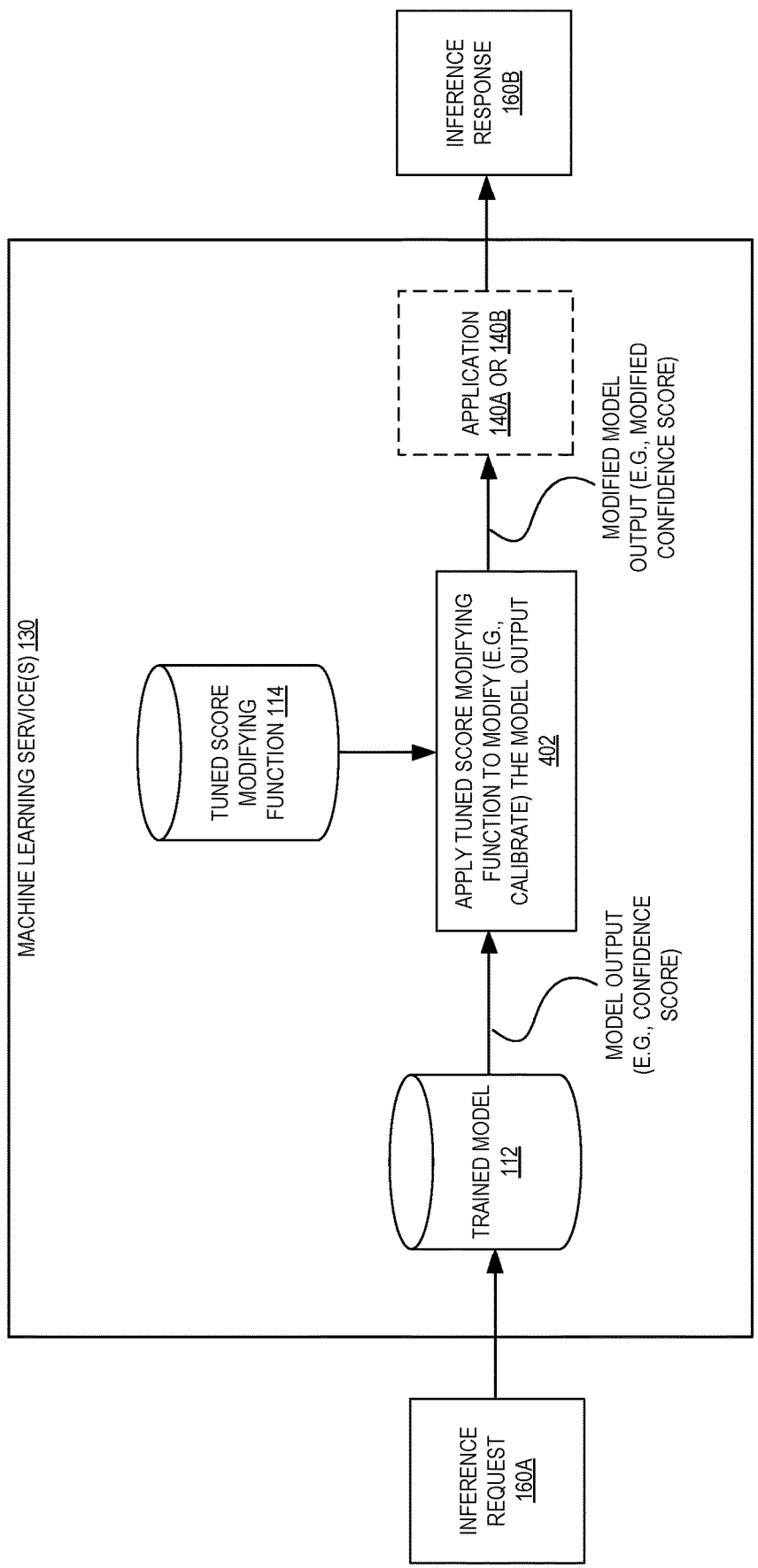
FIG. 4 is a diagram illustrating a machine learning service that modifies the output of a trained model with a tuned score modifying function according to some embodiments.

FIG. 4 is a diagram illustrating a machine learning service 130 that modifies the output of a trained model 112 with a tuned score modifying function 114 according to some embodiments. In certain embodiments, machine learning service 130, e.g., in response to receiving an inference request 160A, inputs an utterance (e.g., not recited in training data) into trained (e.g., NLU) model 112 that generates an output of an intent (e.g., including a confidence score for that intent). As one example (A), an utterance is "I would like a flight from Seattle to New York" and model 112 identifies the intent as "Book a flight" type with a confidence score of a value (e.g., 0.9 on a scale of 0-1, with 0 being the least confidence and 1 being the most confidence). As another example (B), an utterance is "fly from Boston to Seattle" and model 112 identifies the intent as "Book a flight" type with a confidence score of a value (e.g., 0.9 on a scale of 0-1, with 0 being the least confidence and 1 being the most confidence). As yet another example (C), an utterance is "How are you today?" and model 112 identifies the intent as "Book a flight" type with a confidence score of a lower value (e.g., 0.4 on a scale of 0-1, with 0 being the least confidence and 1 being the most confidence).

However, it may be desirable to modify the output from trained model 112 with a tuned, score modifying function (e.g., instead of retraining a model). In FIG. 4, machine learning service 130 at block 402 applies the tuned score modifying function 114 to the model output (e.g., confidence score thereof) from model 112. Using the above three examples, this may produce a modified output (e.g., modified confidence score) that is increased for model output for (A) (e.g., from 0.9 to 0.95 or 0.99), increased for model output for (B) (e.g., from 0.9 to 0.95 or 0.99), and decreased for model output for (C) (e.g., from 0.4 to 0.05). In one embodiment, the tuned score modifying function 114 selects the (e.g., varying) amount to decrease and/or increase a model's output.

In certain embodiments, the modified score is provided as an output (e.g., inference response 160B). In other embodiments, the modified score is provided to an application (e.g., application 140A and/or application 140B in FIG. 1) such that the modified score is used to determine the inference response 160B. As one example, the inference response 160B may be the booking of the requested flight, e.g., confirmation of the booked flight (and its particulars).

Figure 5:
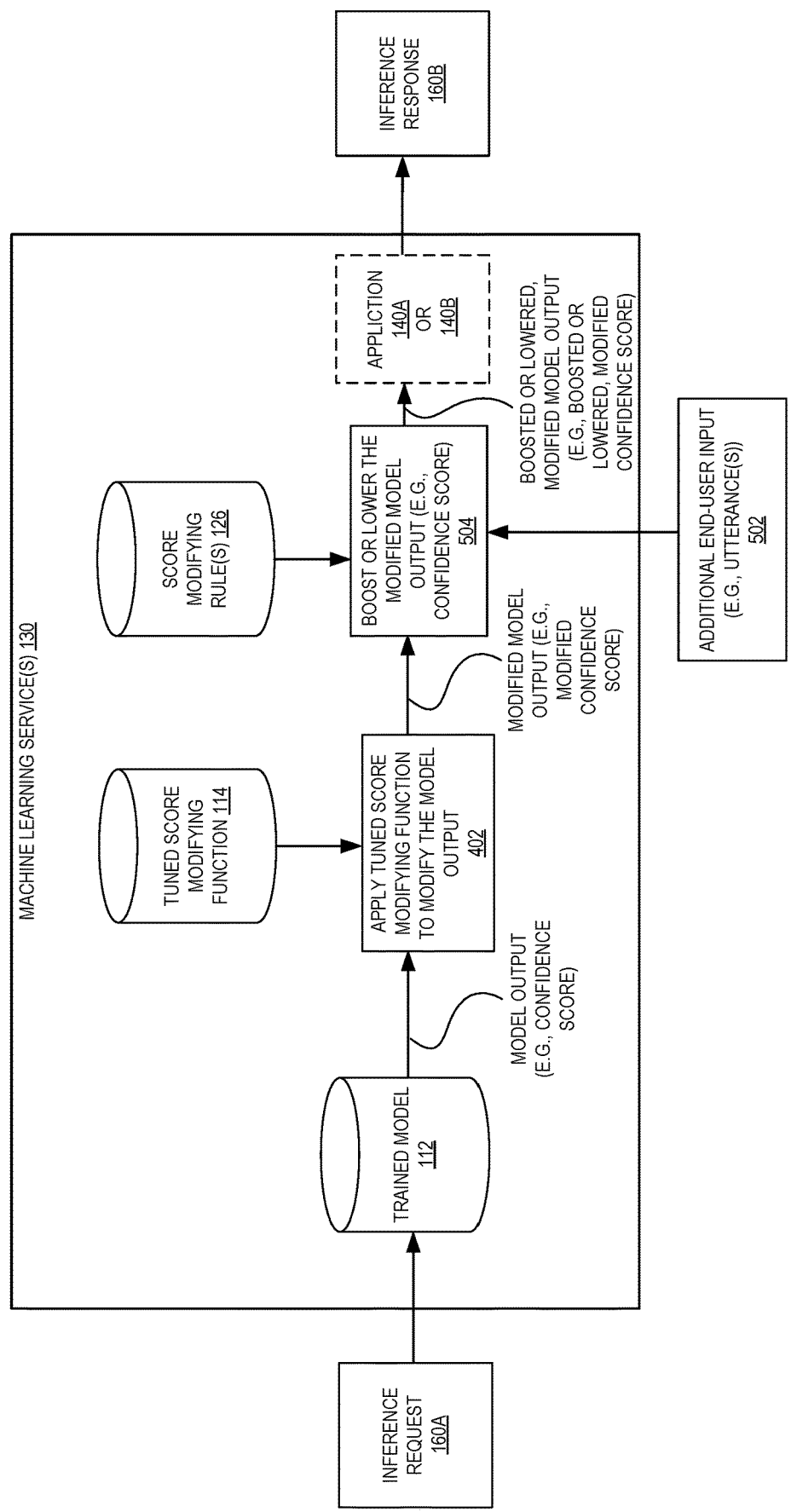
FIG. 5 is a diagram illustrating a machine learning service that changes the output of a trained model with a tuned score modifying function and then boosts or lowers that output according to a score modifying rule according to some embodiments.

FIG. 5 is a diagram illustrating a machine learning service 130 that changes the output of a trained model with a tuned score modifying function 114 and then boosts or lowers that output according to a score modifying rule 126 according to some embodiments. As discussed above, machine learning service 130 modifies an output (e.g., modifies a confidence score thereof) of trained model 112 in certain embodiments. FIG. 5 illustrates that one or more score modifying rules 126 may also be used to boost and/or lower certain the output (e.g., confidence scores thereof). In one embodiment, at block 504, the (e.g., modified) model output is boosted or lowered. This may be based at least in part on one or more additional (e.g., end-user) input(s) 502, for example, one of more additional utterances. As one example, a score modifying rule 126 boosts a score above (e.g., or equal to) a threshold and/or lowers a score above (e.g., or equal to) a threshold (e.g., the thresholds may be the same value). For example, a threshold may be 0.4, such that any score greater (e.g., or equal to) 0.4 is boosted to a higher score, and any score lower (e.g., or equal to) 0.4 is lowered to a lower score. In certain embodiments, the higher score and/or the lower score is selected by the score modifying rule 126, e.g., based on the current score. In one embodiment, the scores are augmented based on scores in the previous dialog turn of a same conversation and/or the number of slot types which have been mentioned in the history of the conversation (e.g., if multiple "Book a flight" types of slots are detected, then the score is boosted in certain embodiments).

In certain embodiments, the boosted or lowered modified model output (e.g., confidence score thereof) is provided as an output (e.g., inference response 160B). In other embodiments, the boosted or lowered modified score is provided to an application (e.g., application 140A and/or application 140B in FIG. 1) such that the boosted or lowered modified score is used to determine the inference response 160B. As one example, the inference response 160B may be the booking of the requested flight, e.g., confirmation of the booked flight (and its particulars).

As one use example, a customer (e.g., not an end user) provides training documents (e.g., annotation sets) to training system 150 that, in response, generates a trained model 112 and a tuned score modifying function 114. As an output, training system may cause an output that indicates the completion of the training and/or provide an interface to allow for the approval (e.g., and deployment) of the trained model 112 and tuned score modifying function 114.

As another use example, a user (e.g., end-user) of that customer provides one or more utterances to the machine learning service (e.g., trained model 112 as hosted model 136 and tuned score modifying function 114 as hosted function 137) to obtain an intent and its corresponding score(s). As an output, machine learning service may use that intent and score(s) to send a result and/or ask a follow-up question(s) to the end-user (e.g., as part of a conversation having multiple turns).

Figure 6:
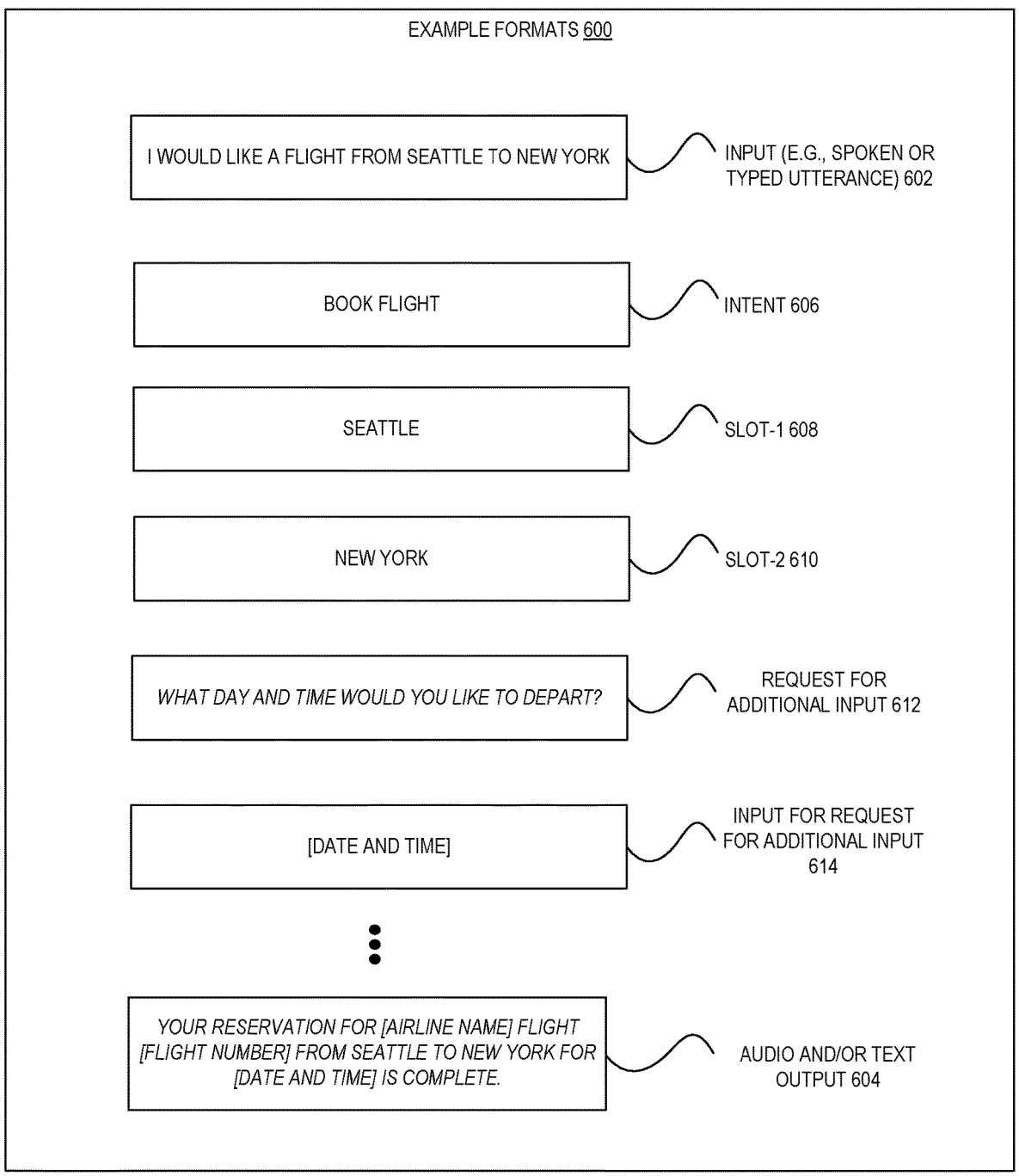
FIG. 6 is a diagram illustrating example formats for data utilized by a machine learning service according to some embodiments.

FIG. 6 is a diagram illustrating example formats 600 for data utilized by a machine learning service according to some embodiments. Example formats 600 includes an input 602 (e.g., spoken or typed utterance), for example "I would like a flight from Seattle to New York", an intent 606 for that input (e.g., Book Flight for the depicted input), a first slot 608 for the intent in the input (e.g., "Seattle" in the depicted input), a second slot 610 for the intent in the input (e.g., "New York" in the depicted input). Intent 606 and slots 608 and 610 may be determined from input 602 by (e.g., NLU) ML model. Corresponding confidence score(s) for the intent 606 and slots 608 and 610 may be modified by tuned score modifying function 114 (e.g., and boosted or lowered according to score modifying rule(s) 126). In one embodiment, a machine learning service sends the user a request (e.g., visually and/or audibly) for additional input 612 (e.g., what day and time would you like to depart) and receives an additional input (e.g., utterance) for that request 614. This may continue until the machine learning service has a threshold of information to fulfill the intent, e.g., according to a dialog model that identifies the steps for a multi-turn conversation between the user and the machine learning service. When the machine learning service has fulfilled the intent (e.g., booking a flight in the above example), it may provide (e.g., audio and/or text) output 604 in confirmation.

Figure 7:
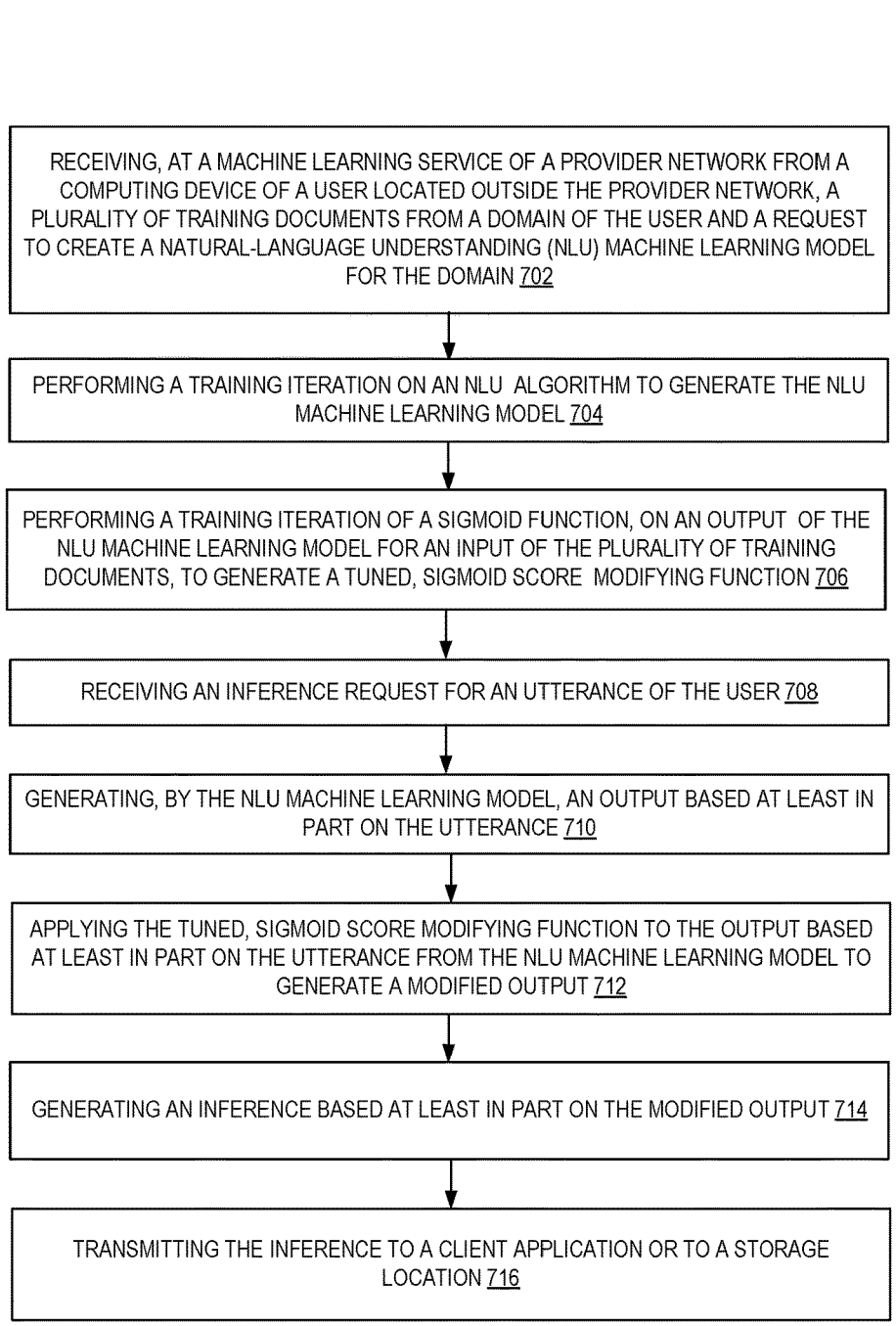
FIG. 7 is a flow diagram illustrating operations of a method for training a natural-language understanding (NLU) machine learning model and a sigmoid function, and performing an inference with the NLU machine learning model and the sigmoid function according to some embodiments.

FIG. 7 is a flow diagram illustrating operations 700 of a method for training a natural-language understanding (NLU) machine learning model and a sigmoid function, and performing an inference with the NLU machine learning model and the sigmoid function according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by machine learning service 102 (e.g., implemented in a provider network) of the other figures.

The operations 700 include, at block 702, receiving, at a machine learning service of a provider network from a computing device of a user located outside the provider network, a plurality of training documents from a domain of the user and a request to create a natural-language understanding (NLU) machine learning model for the domain. The operations 700 further include, at block 704, performing a training iteration on an NLU algorithm to generate the NLU machine learning model. The operations 700 further include, at block 706, performing a training iteration of a sigmoid function, on an output of the NLU machine learning model for an input of the plurality of training documents, to generate a tuned, sigmoid score modifying function. The operations 700 further include, at block 708, receiving an inference request for an utterance of the user. The operations 700 further include, at block 710, generating, by the NLU machine learning model, an output based at least in part on the utterance. The operations 700 further include, at block 712, applying the tuned, sigmoid score modifying function to the output based at least in part on the utterance from the NLU machine learning model to generate a modified output. The operations 700 further include, at block 714, generating an inference based at least in part on the modified output. The operations 700 further include, at block 716, transmitting the inference to a client application or to a storage location.

Figure 8:
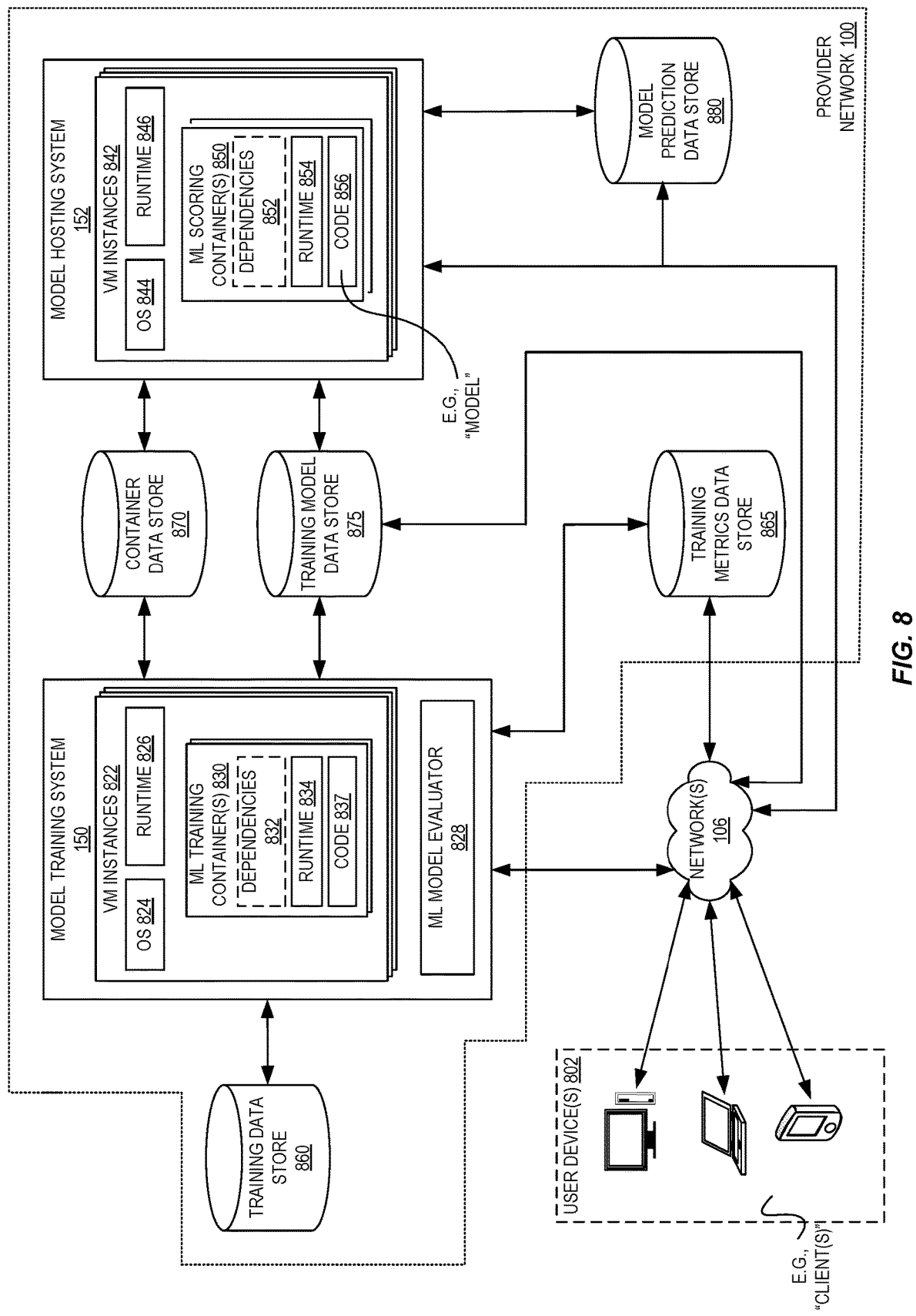
FIG. 8 is a block diagram of an illustrative operating environment in which machine learning models are trained and hosted according to some embodiments.

FIG. 8 is a block diagram of an illustrative operating environment in which machine learning models are trained and hosted according to some embodiments. The operating environment includes end user devices 802 (for example, computing devices 104, computing device 107), a model training system 150, a model hosting system 152, a training data store 860, a training metrics data store 865, a container data store 870, a training model data store 875, and a model prediction data store 880.

A machine learning service 130 described herein may include one or more of these components, such as the model hosting system 152, model training system 150, and so forth.

In some embodiments, users, by way of user devices 802, interact with the model training system 150 to provide data that causes the model training system 150 to train one or more machine learning models, for example, as described elsewhere herein. A machine learning model, generally, may be thought of as one or more equations that are "trained" using a set of data. In some embodiments, the model training system 150 provides ML functionalities as a web service, and thus messaging between user devices 802 and the model training system 150 (or provider network 100), and/or between components of the model training system 150 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 802 can interact with the model training system 150 via frontend of the model training system 150. For example, a user device 802 can provide a training request to the frontend that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 802, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 802 may provide, in the training request, an algorithm written in any programming language. The model training system 150 then packages the algorithm into a container (optionally with other code, such as a "base" ML algorithm supplemented with user-provided code) that is eventually loaded into a virtual machine instance 822 for training a machine learning model, as described in greater detail below. For example, a user, via a user device 802, may develop an algorithm/code using an application (for example, an interactive web-based programming environment) and cause the algorithm/code to be provided—perhaps as part of a training request (or referenced in a training request)—to the model training system 150, where this algorithm/code may be containerized on its own or used together with an existing container having a machine learning framework, for example.

In some embodiments, instead of providing a container image in the training request, the user device 802 provides, in the training request, an indicator of a container image (for example, an indication of an address or a location at which a container image is stored). For example, the container image can be stored in a container data store 870, and this container image may have been previously created/uploaded by the user. The model training system 150 can retrieve the container image from the indicated location and create a container using the retrieved container image. The container is then loaded into a virtual machine instance 822 for training a machine learning model, as described in greater detail below.

The model training system 150 can use the information provided by the user device 802 to train a machine learning model in one or more pre-established virtual machine instances 822 in some embodiments. In particular, the model training system 150 includes a single physical computing device or multiple physical computing devices that are interconnected using one or more computing networks (not shown), where the physical computing device(s) host one or more virtual machine instances 822. The model training system 150 can handle the acquisition and configuration of compute capacity (for example, containers, instances, etc., which are described in greater detail below) based on the information describing the computing machine on which to train a machine learning model provided by the user device 802. The model training system 150 can then train machine learning models using the compute capacity, as is described in greater detail below. The model training system 150 can automatically scale up and down based on the volume of training requests received from user devices 802 via frontend, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 822 are utilized to execute tasks. For example, such tasks can include training a machine learning model. As shown in FIG. 8, each virtual machine instance 822 includes an operating system (OS) 824, a language runtime 826, and one or more ML training containers 830. Generally, the ML training containers 830 are logical units created within a virtual machine instance using the resources available on that instance and can be utilized to isolate execution of a task from other processes (for example, task executions) occurring in the instance. In some embodiments, the ML training containers 830 are formed from one or more container images and a top container layer. Each container image may further include one or more image layers, where each image layer represents an executable instruction. As described above, some or all of the executable instructions together represent an algorithm that defines a machine learning model. Changes made to the ML training containers 830 (for example, creation of new files, modification of existing files, deletion of files, etc.) are stored in the top container layer. If a ML training container 830 is deleted, the top container layer is also deleted. However, the container image(s) that form a portion of the deleted ML training container 830 can remain unchanged. The ML training containers 830 can be implemented, for example, as Linux containers (LXC), Docker containers, and the like.

The ML training containers 830 may include individual a runtime 834, code 837, and dependencies 832 needed by the code 837 in some embodiments. The runtime 834 can be defined by one or more executable instructions that form at least a portion of a container image that is used to form the ML training container 830 (for example, the executable instruction(s) in the container image that define the operating system and/or runtime to run in the container formed from the container image). The code 837 includes one or more executable instructions that form at least a portion of a container image that is used to form the ML training container 830. For example, the code 837 includes the executable instructions in the container image that represent an algorithm that defines a machine learning model, which may reference (or utilize) code or libraries from dependencies 832. The runtime 834 is configured to execute the code 837 in response to an instruction to begin machine learning model training Execution of the code 837 results in the generation of model data, as described in greater detail below.

In some embodiments, the code 837 includes executable instructions that represent algorithms that define different machine learning models. For example, the code 837 includes one set of executable instructions that represent a first algorithm that defines a first machine learning model and a second set of executable instructions that represent a second algorithm that defines a second machine learning model. In some embodiments, the virtual machine instance 822 executes the code 837 and trains all of the machine learning models. In some embodiments, the virtual machine instance 822 executes the code 837, selecting one of the machine learning models to train. For example, the virtual machine instance 822 can identify a type of training data indicated by the training request and select a machine learning model to train (for example, execute the executable instructions that represent an algorithm that defines the selected machine learning model) that corresponds with the identified type of training data.

In some embodiments, the runtime 834 is the same as the runtime 826 utilized by the virtual machine instance 822. In some embodiments, the runtime 834 is different than the runtime 826 utilized by the virtual machine instance 822.

In some embodiments, the model training system 150 uses one or more container images included in a training request (or a container image retrieved from the container data store 870 in response to a received training request) to create and initialize a ML training container 830 in a virtual machine instance 822. For example, the model training system 150 creates a ML training container 830 that includes the container image(s) and/or a top container layer.

Prior to beginning the training process, in some embodiments, the model training system 150 retrieves training data from the location indicated in the training request. For example, the location indicated in the training request can be a location in the training data store 860. Thus, the model training system 150 retrieves the training data from the indicated location in the training data store 860. In some embodiments, the model training system 150 does not retrieve the training data prior to beginning the training process. Rather, the model training system 150 streams the training data from the indicated location during the training process. For example, the model training system 150 can initially retrieve a portion of the training data and provide the retrieved portion to the virtual machine instance 822 training the machine learning model. Once the virtual machine instance 822 has applied and used the retrieved portion or once the virtual machine instance 822 is about to use all of the retrieved portion (for example, a buffer storing the retrieved portion is nearly empty), then the model training system 150 can retrieve a second portion of the training data and provide the second retrieved portion to the virtual machine instance 822, and so on.

To perform the machine learning model training, the virtual machine instance 822 executes code 837 stored in the ML training container 830 in some embodiments. For example, the code 837 includes some or all of the executable instructions that form the container image of the ML training container 830 initialized therein. Thus, the virtual machine instance 822 executes some or all of the executable instructions that form the container image of the ML training container 830 initialized therein to train a machine learning model. The virtual machine instance 822 executes some or all of the executable instructions according to the hyperparameter values included in the training request. As an illustrative example, the virtual machine instance 822 trains a machine learning model by identifying values for certain parameters (for example, coefficients, weights, centroids, etc.). The identified values depend on hyperparameters that define how the training is performed. Thus, the virtual machine instance 822 can execute the executable instructions to initiate a machine learning model training process, where the training process is run using the hyperparameter values included in the training request. Execution of the executable instructions can include the virtual machine instance 822 applying the training data retrieved by the model training system 150 as input parameters to some or all of the instructions being executed.

In some embodiments, executing the executable instructions causes the virtual machine instance 822 (for example, the ML training container 830) to generate model data. For example, the ML training container 830 generates model data and stores the model data in a file system of the ML training container 830. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 830 such that the model data is written to the top container layer of the ML training container 830 and/or the container image(s) that forms a portion of the ML training container 830 is modified to include the model data.

The virtual machine instance 822 (or the model training system 150 itself) pulls the generated model data from the ML training container 830 and stores the generated model data in the training model data store 875 in an entry associated with the virtual machine instance 822 and/or the machine learning model being trained. In some embodiments, the virtual machine instance 822 generates a single file that includes model data and stores the single file in the training model data store 875. In some embodiments, the virtual machine instance 822 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 822 can package the multiple files into a single file once training is complete and store the single file in the training model data store 875. Alternatively, the virtual machine instance 822 stores the multiple files in the training model data store 875. The virtual machine instance 822 stores the file(s) in the training model data store 875 while the training process is ongoing and/or after the training process is complete.

In some embodiments, the virtual machine instance 822 regularly stores model data file(s) in the training model data store 875 as the training process is ongoing. Thus, model data file(s) can be stored in the training model data store 875 at different times during the training process. Each set of model data files corresponding to a particular time or each set of model data files present in the training model data store 875 as of a particular time could be checkpoints that represent different versions of a partially-trained machine learning model during different stages of the training process. Accordingly, before training is complete, a user, via the user device 802 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 875.

In some embodiments, a virtual machine instance 822 executes code 837 stored in a plurality of ML training containers 830. For example, the algorithm included in the container image can be in a format that allows for the parallelization of the training process. Thus, the model training system 150 can create multiple copies of the container image provided in a training request and cause the virtual machine instance 822 to load each container image copy in a separate ML training container 830. The virtual machine instance 822 can then execute, in parallel, the code 837 stored in the ML training containers 830. The virtual machine instance 822 can further provide configuration information to each ML training container 830 (for example, information indicating that N ML training containers 830 are collectively training a machine learning model and that a particular ML training container 830 receiving the configuration information is ML training container 830 number X of N), which can be included in the resulting model data. By parallelizing the training process, the model training system 150 can significantly reduce the training time in some embodiments.

In some embodiments, a plurality of virtual machine instances 822 execute code 837 stored in a plurality of ML training containers 830. For example, the resources used to train a particular machine learning model can exceed the limitations of a single virtual machine instance 822. However, the algorithm included in the container image can be in a format that allows for the parallelization of the training process. Thus, the model training system 150 can create multiple copies of the container image provided in a training request, initialize multiple virtual machine instances 822, and cause each virtual machine instance 822 to load a container image copy in one or more separate ML training containers 830. The virtual machine instances 822 can then each execute the code 837 stored in the ML training containers 830 in parallel. The model training system 150 can further provide configuration information to each ML training container 830 via the virtual machine instances 822 (for example, information indicating that N ML training containers 830 are collectively training a machine learning model and that a particular ML training container 830 receiving the configuration information is ML training container 830 number X of N, information indicating that M virtual machine instances 822 are collectively training a machine learning model and that a particular ML training container 830 receiving the configuration information is initialized in virtual machine instance 822 number Y of M, etc.), which can be included in the resulting model data. As described above, by parallelizing the training process, the model training system 150 can significantly reduce the training time in some embodiments.

In some embodiments, the model training system 150 includes a plurality of physical computing devices and two or more of the physical computing devices hosts one or more virtual machine instances 822 that execute the code 837. Thus, the parallelization can occur over different physical computing devices in addition to over different virtual machine instances 822 and/or ML training containers 830.

In some embodiments, the model training system 150 includes a ML model evaluator 828. The ML model evaluator 828 can monitor virtual machine instances 822 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 828 can obtain the model data for a machine learning model being trained and evaluation data from the training data store 860. The evaluation data is separate from the data used to train a machine learning model and includes both input data and expected outputs (for example, known results), and thus the ML model evaluator 828 can define a machine learning model using the model data and execute the machine learning model by providing the input data as inputs to the machine learning model. The ML model evaluator 828 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 828 periodically generates model metrics during the training process and stores the model metrics in the training metrics data store 865 in some embodiments. While the machine learning model is being trained, a user, via the user device 802, can access and retrieve the model metrics from the training metrics data store 865. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 802, can transmit a request to the model training system 150 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 150 can modify the machine learning model accordingly. For example, the model training system 150 can cause the virtual machine instance 822 to optionally delete an existing ML training container 830, create and initialize a new ML training container 830 using some or all of the information included in the request, and execute the code 837 stored in the new ML training container 830 to restart the machine learning model training process. As another example, the model training system 150 can cause the virtual machine instance 822 to modify the execution of code stored in an existing ML training container 830 according to the data provided in the modification request. In some embodiments, the user, via the user device 802, can transmit a request to the model training system 150 to stop the machine learning model training process. The model training system 150 can then instruct the virtual machine instance 822 to delete the ML training container 830 and/or to delete any model data stored in the training model data store 875.

As described below, in some embodiments, the model data stored in the training model data store 875 is used by the model hosting system 152 to deploy machine learning models. Alternatively or additionally, a user device 802 or another computing device (not shown) can retrieve the model data from the training model data store 875 to implement a learning algorithm in an external device. As an illustrative example, a robotic device can include sensors to capture input data. A user device 802 can retrieve the model data from the training model data store 875 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 822 are shown in FIG. 8 as a single grouping of virtual machine instances 822, some embodiments of the present application separate virtual machine instances 822 that are actively assigned to execute tasks from those virtual machine instances 822 that are not actively assigned to execute tasks. For example, those virtual machine instances 822 actively assigned to execute tasks are grouped into an "active pool," while those virtual machine instances 822 not actively assigned to execute tasks are placed within a "warming pool." In some embodiments, those virtual machine instances 822 within the warming pool can be pre-initialized with an operating system, language runtimes, and/or other software required to enable rapid execution of tasks (for example, rapid initialization of machine learning model training in ML training container(s) 830) in response to training requests.

In some embodiments, the model training system 150 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model hosting system 152, etc.). The processing unit can also communicate to and from a memory of a virtual machine instance 822 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 152 includes a single physical computing device or multiple physical computing devices that are interconnected using one or more computing networks (not shown), where the physical computing device(s) host one or more virtual machine instances 842. The model hosting system 152 can handle the acquisition and configuration of compute capacity (for example, containers, instances, etc.) based on demand for the execution of trained machine learning models. The model hosting system 152 can then execute machine learning models using the compute capacity, as is described in greater detail below. The model hosting system 152 can automatically scale up and down based on the volume of execution requests received from user devices 802 via frontend of the model hosting system 152, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 842 are utilized to execute tasks. For example, such tasks can include executing a machine learning model. As shown in FIG. 8, each virtual machine instance 842 includes an operating system (OS) 844, a language runtime 846, and one or more ML scoring containers 850. The ML scoring containers 850 are similar to the ML training containers 830 in that the ML scoring containers 850 are logical units created within a virtual machine instance using the resources available on that instance and can be utilized to isolate execution of a task from other processes (for example, task executions) occurring in the instance. In some embodiments, the ML scoring containers 850 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 850 (for example, creation of new files, modification of existing files, deletion of files, etc.) are stored in the top container layer. If a ML scoring container 850 is deleted, the top container layer is also deleted. However, the container image(s) that form a portion of the deleted ML scoring container 850 can remain unchanged. The ML scoring containers 850 can be implemented, for example, as Linux containers.

The ML scoring containers 850 each include a runtime 854, code 856, and dependencies 852 (for example, supporting software such as libraries) needed by the code 856 in some embodiments. The runtime 854 can be defined by one or more executable instructions that form at least a portion of a container image that is used to form the ML scoring container 850 (for example, the executable instruction(s) in the container image that define the operating system and/or runtime to run in the container formed from the container image). The code 856 includes one or more executable instructions that form at least a portion of a container image that is used to form the ML scoring container 850. For example, the code 856 includes the executable instructions in the container image that represent an algorithm that defines a machine learning model, which may reference dependencies 852. The code 856 can also include model data that represent characteristics of the defined machine learning model, as described in greater detail below. The runtime 854 is configured to execute the code 856 in response to an instruction to begin execution of a machine learning model. Execution of the code 856 results in the generation of outputs (for example, predicted results), as described in greater detail below.

In some embodiments, the runtime 854 is the same as the runtime 846 utilized by the virtual machine instance 842. In some embodiments, runtime 854 is different than the runtime 846 utilized by the virtual machine instance 842.

In some embodiments, the model hosting system 152 uses one or more container images included in a deployment request (or a container image retrieved from the container data store 870 in response to a received deployment request) to create and initialize a ML scoring container 850 in a virtual machine instance 842. For example, the model hosting system 152 creates a ML scoring container 850 that includes the container image(s) and/or a top container layer.

As described above, a user device 802 can submit a deployment request and/or an execution request to the model hosting system 152 via the frontend in some embodiments. A deployment request causes the model hosting system 152 to deploy a trained machine learning model into a virtual machine instance 842. For example, the deployment request can include an identification of an endpoint (for example, an endpoint name, such as an HTTP endpoint name) and an identification of one or more trained machine learning models (for example, a location of one or more model data files stored in the training model data store 875). Optionally, the deployment request also includes an identification of one or more container images stored in the container data store 870.

Upon receiving the deployment request, the model hosting system 152 initializes ones or more ML scoring containers 850 in one or more hosted virtual machine instance 842. In embodiments in which the deployment request includes an identification of one or more container images, the model hosting system 152 forms the ML scoring container(s) 850 from the identified container image(s). For example, a container image identified in a deployment request can be the same container image used to form an ML training container 830 used to train the machine learning model corresponding to the deployment request. Thus, the code 856 of the ML scoring container(s) 850 includes one or more executable instructions in the container image(s) that represent an algorithm that defines a machine learning model. In embodiments in which the deployment request does not include an identification of a container image, the model hosting system 152 forms the ML scoring container(s) 850 from one or more container images stored in the container data store 870 that are appropriate for executing the identified trained machine learning model(s). For example, an appropriate container image can be a container image that includes executable instructions that represent an algorithm that defines the identified trained machine learning model(s).

The model hosting system 152 further forms the ML scoring container(s) 850 by retrieving model data corresponding to the identified trained machine learning model(s) in some embodiments. For example, the deployment request can identify a location of model data file(s) stored in the training model data store 875. In embodiments in which a single model data file is identified in the deployment request, the model hosting system 152 retrieves the identified model data file from the training model data store 875 and inserts the model data file into a single ML scoring container 850, which forms a portion of code 856. In some embodiments, the model data file is archived or compressed (for example, formed from a package of individual files). Thus, the model hosting system 152 unarchives or decompresses the model data file to obtain multiple individual files and inserts the individual files into the ML scoring container 850. In some embodiments, the model hosting system 152 stores the model data file in the same location as the location in which the model data file was stored in the ML training container 830 that generated the model data file. For example, the model data file initially was stored in the top container layer of the ML training container 830 at a certain offset, and the model hosting system 152 then stores the model data file in the top container layer of the ML scoring container 850 at the same offset.

In embodiments in which multiple model data files are identified in the deployment request, the model hosting system 152 retrieves the identified model data files from the training model data store 875. The model hosting system 152 can insert the model data files into the same ML scoring container 850, into different ML scoring containers 850 initialized in the same virtual machine instance 842, or into different ML scoring containers 850 initialized in different virtual machine instances 842. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 152 associates the initialized ML scoring container(s) 850 with the endpoint identified in the deployment request. For example, each of the initialized ML scoring container(s) 850 can be associated with a network address. The model hosting system 152 can map the network address(es) to the identified endpoint, and the model hosting system 152 or another system (for example, a routing system, not shown) can store the mapping. Thus, a user device 802 can refer to trained machine learning model(s) stored in the ML scoring container(s) 850 using the endpoint. This allows for the network address of an ML scoring container 850 to change without causing the user operating the user device 802 to change the way in which the user refers to a trained machine learning model.

Once the ML scoring container(s) 850 are initialized, the ML scoring container(s) 850 are ready to execute trained machine learning model(s). In some embodiments, the user device 802 transmits an execution request to the model hosting system 152 via the frontend, where the execution request identifies an endpoint and includes an input to a machine learning model (for example, a set of input data). The model hosting system 152 or another system (for example, a routing system, not shown) can obtain the execution request, identify the ML scoring container(s) 850 corresponding to the identified endpoint, and route the input to the identified ML scoring container(s) 850.

In some embodiments, a virtual machine instance 842 executes the code 856 stored in an identified ML scoring container 850 in response to the model hosting system 152 receiving the execution request. In particular, execution of the code 856 causes the executable instructions in the code 856 corresponding to the algorithm to read the model data file stored in the ML scoring container 850, use the input included in the execution request as an input parameter, and generate a corresponding output. As an illustrative example, the algorithm can include coefficients, weights, layers, cluster centroids, and/or the like. The executable instructions in the code 856 corresponding to the algorithm can read the model data file to determine values for the coefficients, weights, layers, cluster centroids, and/or the like. The executable instructions can include input parameters, and the input included in the execution request can be supplied by the virtual machine instance 842 as the input parameters. With the machine learning model characteristics and the input parameters provided, execution of the executable instructions by the virtual machine instance 842 can be completed, resulting in an output.

In some embodiments, the virtual machine instance 842 stores the output in the model prediction data store 880. Alternatively or in addition, the virtual machine instance 842 transmits the output to the user device 802 that submitted the execution result via the frontend.

In some embodiments, the execution request corresponds to a group of related trained machine learning models. Thus, the ML scoring container 850 can transmit the output to a second ML scoring container 850 initialized in the same virtual machine instance 842 or in a different virtual machine instance 842. The virtual machine instance 842 that initialized the second ML scoring container 850 can then execute second code 856 stored in the second ML scoring container 850, providing the received output as an input parameter to the executable instructions in the second code 856. The second ML scoring container 850 further includes a model data file stored therein, which is read by the executable instructions in the second code 856 to determine values for the characteristics defining the machine learning model. Execution of the second code 856 results in a second output. The virtual machine instance 842 that initialized the second ML scoring container 850 can then transmit the second output to the model prediction data store 880 and/or the user device 802 via the frontend (for example, if no more trained machine learning models are needed to generate an output) or transmit the second output to a third ML scoring container 850 initialized in the same or different virtual machine instance 842 (for example, if outputs from one or more additional trained machine learning models are needed), and the above-referenced process can be repeated with respect to the third ML scoring container 850.

While the virtual machine instances 842 are shown in FIG. 8 as a single grouping of virtual machine instances 842, some embodiments of the present application separate virtual machine instances 842 that are actively assigned to execute tasks from those virtual machine instances 842 that are not actively assigned to execute tasks. For example, those virtual machine instances 842 actively assigned to execute tasks are grouped into an "active pool," while those virtual machine instances 842 not actively assigned to execute tasks are placed within a "warming pool." In some embodiments, those virtual machine instances 842 within the warming pool can be pre-initialized with an operating system, language runtimes, and/or other software required to enable rapid execution of tasks (for example, rapid initialization of ML scoring container(s) 850, rapid execution of code 856 in ML scoring container(s), etc.) in response to deployment and/or execution requests.

In some embodiments, the model hosting system 152 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 802, the model training system 150, etc.). The processing unit can also communicate to and from a memory of a virtual machine instance 842 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 150 and the model hosting system 152 depicted in FIG. 8 are not meant to be limiting. For example, the model training system 150 and/or the model hosting system 152 could also operate within a computing environment having a fewer or greater number of devices than are illustrated in FIG. 8. Thus, the depiction of the model training system 150 and/or the model hosting system 152 in FIG. 8 may be taken as illustrative and not limiting to the present disclosure. For example, the model training system 150 and/or the model hosting system 152 or various constituents thereof could implement various web services components, hosted or "cloud" computing environments, and/or peer-to-peer network configurations to implement at least a portion of the processes described herein. In some embodiments, the model training system 150 and/or the model hosting system 152 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend of model training system 150 processes all training requests received from user devices 802 and provisions virtual machine instances 822. In some embodiments, the frontend serves as a front door to all the other services provided by the model training system 150. The frontend processes the requests and makes sure that the requests are properly authorized. For example, the frontend may determine whether the user associated with the training request is authorized to initiate the training process.

Similarly, frontend for model hosting system 152 processes all deployment and execution requests received from user devices 802 and provisions virtual machine instances 842. In some embodiments, the frontend serves as a front door to all the other services provided by the model hosting system 152. The frontend processes the requests and makes sure that the requests are properly authorized. For example, the frontend may determine whether the user associated with a deployment request or an execution request is authorized to access the indicated model data and/or to execute the indicated machine learning model.

The training data store 860 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 860 is depicted as being located external to the model training system 150 and the model hosting system 152, this is not meant to be limiting. For example, in some embodiments not shown, the training data store 860 is located internal to at least one of the model training system 150 or the model hosting system 152.

In some embodiments, the training metrics data store 865 stores model metrics. While the training metrics data store 865 is depicted as being located external to the model training system 150 and the model hosting system 152, this is not meant to be limiting. For example, in some embodiments not shown, the training metrics data store 865 is located internal to at least one of the model training system 150 or the model hosting system 152.

The container data store 870 stores container images, such as container images used to form ML training containers 830 and/or ML scoring containers 850, that can be retrieved by various virtual machine instances 822 and/or 842. While the container data store 870 is depicted as being located external to the model training system 150 and the model hosting system 152, this is not meant to be limiting. For example, in some embodiments not shown, the container data store 870 is located internal to at least one of the model training system 150 and the model hosting system 152.

The training model data store 875 stores model data files. In some embodiments, some of the model data files are comprised of a single file, while other model data files are packages of multiple individual files. While the training model data store 875 is depicted as being located external to the model training system 150 and the model hosting system 152, this is not meant to be limiting. For example, in some embodiments not shown, the training model data store 875 is located internal to at least one of the model training system 150 or the model hosting system 152.

The model prediction data store 880 stores outputs (for example, execution results) generated by the ML scoring containers 850 in some embodiments. While the model prediction data store 880 is depicted as being located external to the model training system 150 and the model hosting system 152, this is not meant to be limiting. For example, in some embodiments not shown, the model prediction data store 880 is located internal to at least one of the model training system 150 and the model hosting system 152.

While the model training system 150, the model hosting system 152, the training data store 860, the training metrics data store 865, the container data store 870, the training model data store 875, and the model prediction data store 880 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 802 via the one or more network(s) 106.

Various example user devices 802 are shown in FIG. 8, including a desktop computer, laptop, and a mobile phone, each provided by way of illustration. In general, the user devices 802 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 150 and/or the model hosting system 152 provides the user devices 802 with one or more user interfaces, command-line interfaces (CLI), application programing interfaces (API), and/or other programmatic interfaces for submitting training requests, deployment requests, and/or execution requests. In some embodiments, the user devices 802 can execute a stand-alone application that interacts with the model training system 150 and/or the model hosting system 152 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 9:
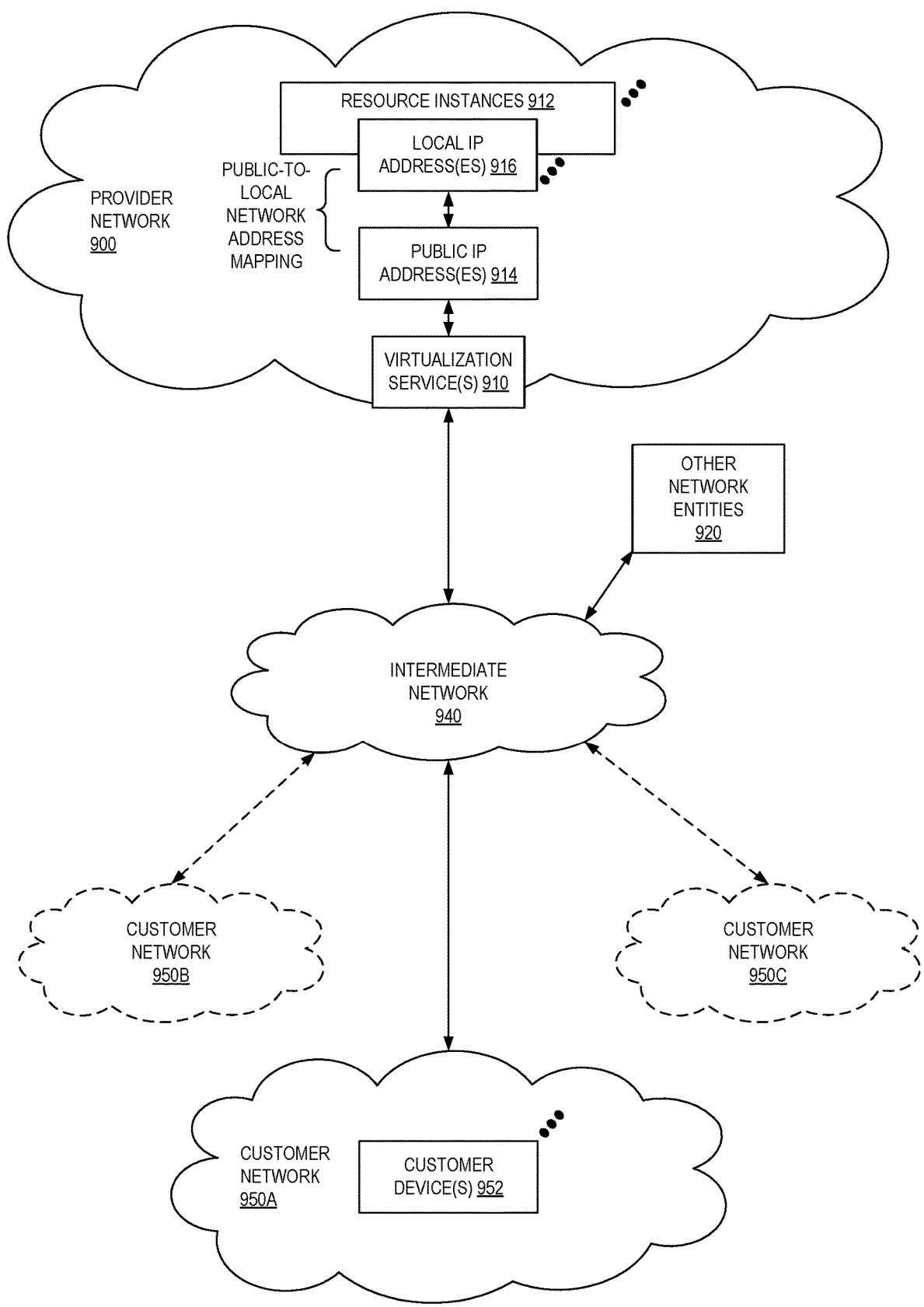
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account.

The customer IP addresses, for example, enable a customer to engineer around problems with the customer's resource instances or software by remapping customer IP addresses to replacement resource instances.

Figure 10:
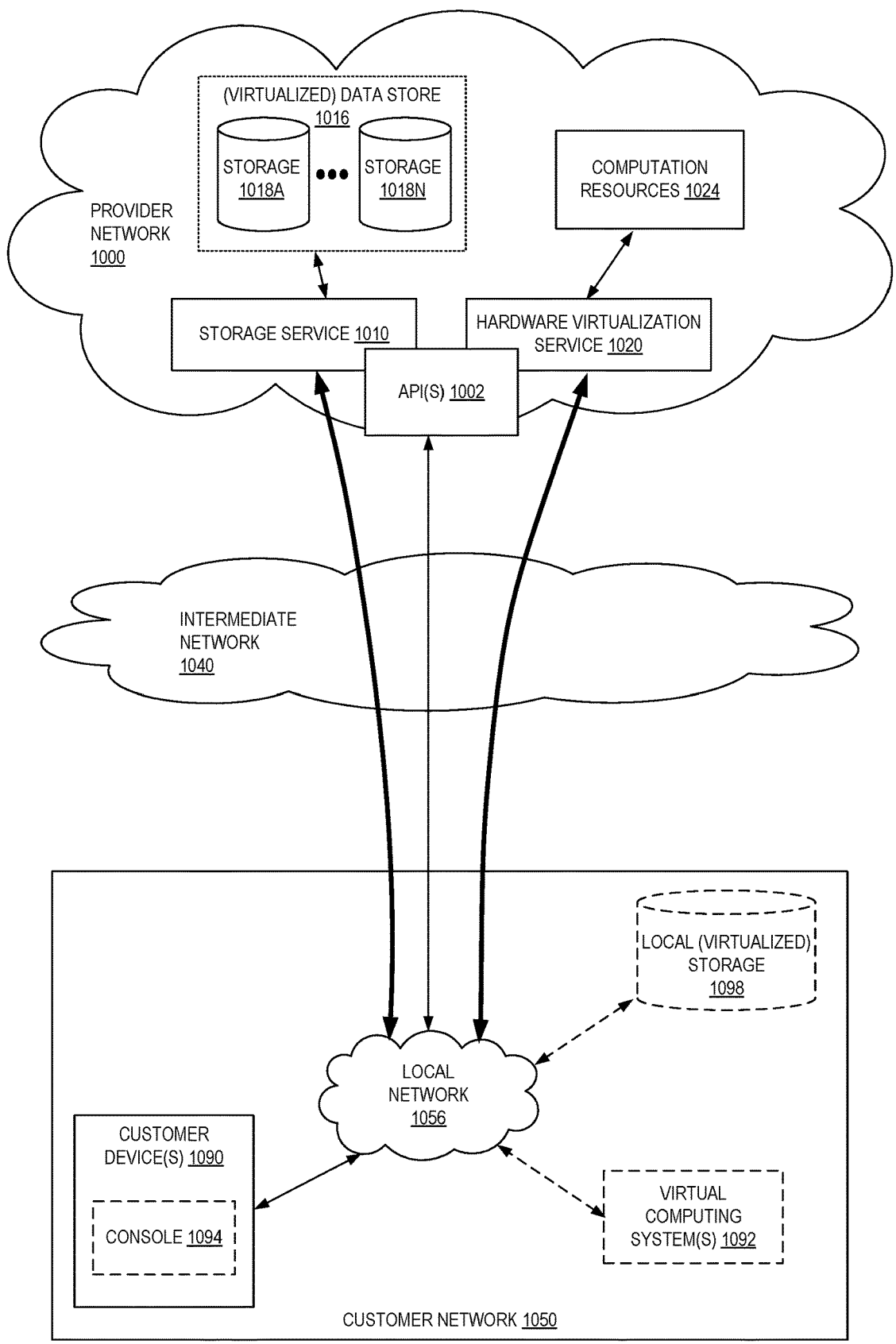
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

Figure 11:
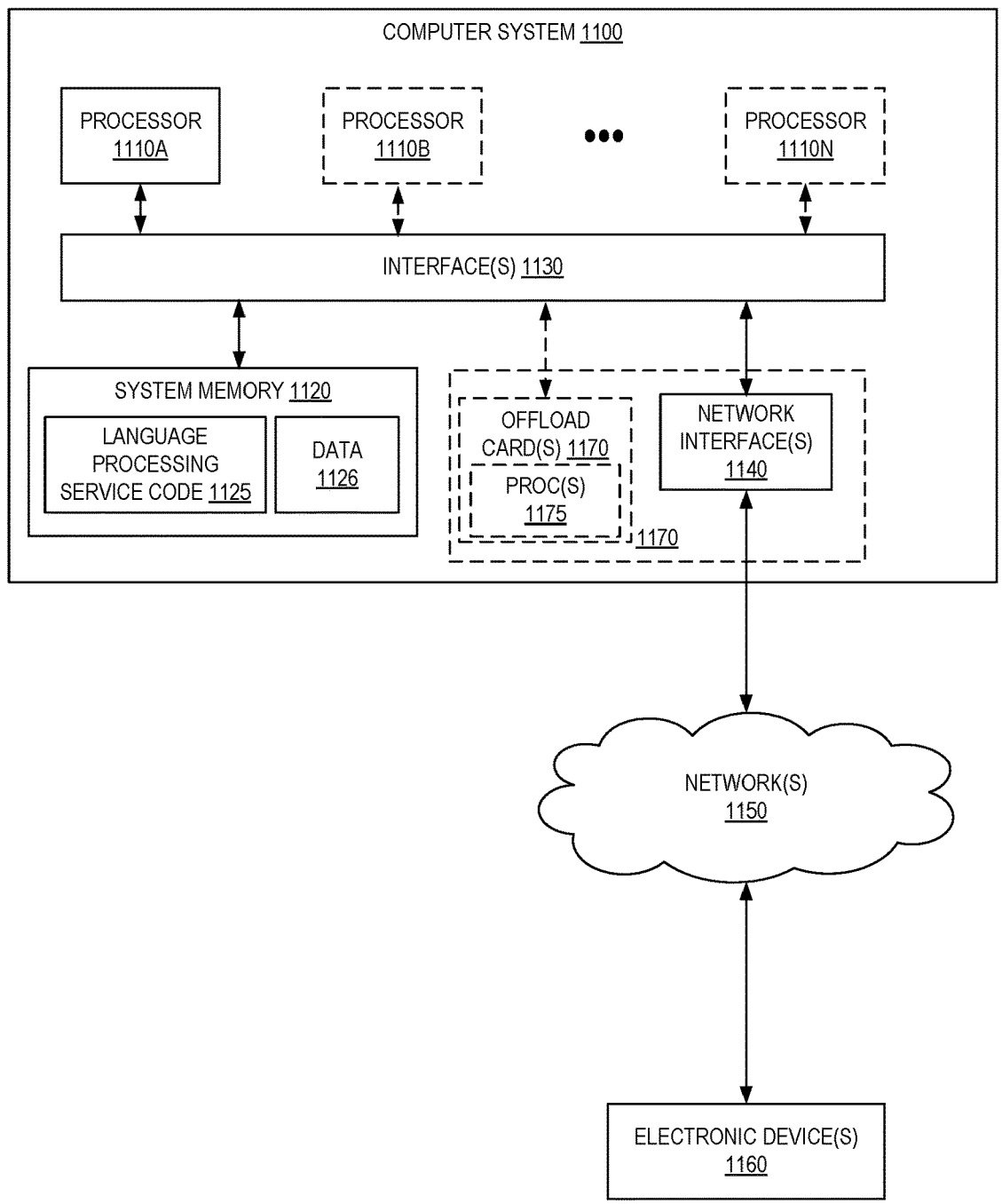
FIG. 11 is a block diagram illustrating an example computer system that may be used in some embodiments.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as language processing service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a machine learning service of a provider network from a computing device of a user located outside the provider network, a plurality of training documents from a domain of the user and a request to create a natural-language understanding (NLU) machine learning model for the domain;
    performing a training iteration on an NLU algorithm to generate the NLU machine learning model;
    performing a training iteration of a sigmoid function to tune calibration parameters of the sigmoid function, on an output of the NLU machine learning model for an input of the plurality of training documents, to generate a tuned, sigmoid score modifying function comprising tuned calibration parameters;
    receiving an inference request for an utterance of the user;
    generating, by the NLU machine learning model, an output based at least in part on the utterance;
    applying the tuned, sigmoid score modifying function to the output based at least in part on the utterance from the NLU machine learning model to generate a modified output;
    generating an inference based at least in part on the modified output; and
    transmitting the inference to a client application or to a storage location.

2. The computer-implemented method of claim 1, further comprising, before the generating the inference, boosting or lowering the modified output according to at least one score modifying rule to change the modified output into a further modified output, and generating the inference based at least in part on the further modified output.

3. The computer-implemented method of claim 1, further comprising:
    receiving a request to retune the sigmoid function from the user;
    performing, in response to the request to retune the sigmoid function, a second training iteration of the sigmoid function, on an output of the NLU machine learning model for an input of one or more training documents, to generate an updated tuned, sigmoid score modifying function without performing an additional training iteration of the NLU machine learning model;
    receiving a second inference request for a second utterance of the user;
    generating, by the NLU machine learning model, an output based at least in part on the second utterance;
    applying the updated tuned, sigmoid score modifying function to the output based at least in part on the second utterance from the NLU machine learning model to generate a second modified output;
    generating a second inference based at least in part on the second modified output; and transmitting the second inference to the client application or to the storage location.

4. A computer-implemented method comprising:
receiving, from a computing device of a user, a plurality of training documents of the user and a request to create a machine learning model;
performing a training iteration on an algorithm to generate the machine learning model;
performing a training iteration of a function to tune parameters of the function, on an output of the machine learning model for an input of the plurality of training documents, to generate a tuned, output modifying function comprising tuned parameters;
receiving an inference request for an utterance of the user;
generating, by the machine learning model, an output based at least in part on the utterance;
applying the tuned, output modifying function to the output based at least in part on the utterance from the machine learning model to generate a modified output;
generating an inference based at least in part on the modified output; and
transmitting the inference to a client application or to a storage location.

5. The computer-implemented method of claim 4, further comprising, before the generating the inference, boosting or lowering the modified output according to a score modifying rule to change the modified output into a further modified output, and generating the inference based at least in part on the further modified output.

6. The computer-implemented method of claim 5, further comprising setting a threshold for the score modifying rule to cause the boosting of the modified output to a higher value as the further modified output when the modified output is above the threshold and the lowering of the modified output to a lower value as the further modified output when the modified output is below the threshold.

7. The computer-implemented method of claim 5, further comprising:
requesting an additional utterance from the user for a conversation including the utterance; and
receiving the additional utterance from the user, wherein the boosting and the lowering is based at least in part on the additional utterance.

8. The computer-implemented method of claim 5, wherein the boosting or lowering of the modified output according to the score modifying rule is based at least in part on a confidence score in a previous turn for a conversation including the utterance.

9. The computer-implemented method of claim 5, wherein the boosting or lowering of the modified output according to the score modifying rule is based at least in part on a number of slot types that have been detected in a conversation including the utterance.

10. The computer-implemented method of claim 4, wherein the outputs of the machine learning model and the modified output of the tuned, output modifying function comprise respective confidence scores.

11. The computer-implemented method of claim 4, further comprising:
receiving a request to retune the function from the user; and
performing, in response to the request to retune the function, a second training iteration of the function, on an output of the machine learning model for an input of one or more training documents, to generate an updated tuned, output modifying function without performing an additional training iteration of the machine learning model.

12. The computer-implemented method of claim 11, further comprising:
receiving a second inference request for a second utterance of the user;
generating, by the machine learning model, an output based at least in part on the second utterance;
applying the updated tuned, output modifying function to the output based at least in part on the second utterance from the machine learning model to generate a second modified output;
generating a second inference based at least in part on the second modified output; and
transmitting the second inference to the client application or to the storage location.

13. The computer-implemented method of claim 4, wherein the tuned, output modifying function maps a logit of the output based at least in part on the utterance by the machine learning model into a score within a range.

14. The computer-implemented method of claim 4, wherein the performing the training iteration of the function comprises tuning the parameters of the function to optimize a loss function for in domain and out of domain intent classification for the user.

15. A system comprising:
a first one or more electronic devices to implement a storage service in a multi-tenant provider network, the storage service to receive and store, from a computing device of a user, a plurality of training documents of the user; and
a second one or more electronic devices to implement a machine learning service in the multi-tenant provider network, the machine learning service including instructions that upon execution cause the machine learning service to perform operations comprising:
receiving, from the computing device of the user, a request to create a machine learning model,
performing a training iteration on an algorithm to generate the machine learning model,
performing a training iteration of a function to tune parameters of the function, on an output of the machine learning model for an input of the plurality of training documents, to generate a tuned, output modifying function comprising tuned parameters,
receiving an inference request for an utterance of the user,
generating, by the machine learning model, an output based at least in part on the utterance,
applying the tuned, output modifying function to the output based at least in part on the utterance from the machine learning model to generate a modified output,
generating an inference based at least in part on the modified output, and
transmitting the inference to a client application or to a storage location.

16. The system of claim 15, wherein the instructions upon execution cause the machine learning service to perform operations further comprising, before the generating the inference, boosting or lowering the modified output according to a score modifying rule to change the modified output into a further modified output, and generating the inference based at least in part on the further modified output.

17. The system of claim 16, wherein the instructions upon execution cause the machine learning service to perform operations further comprising:
  requesting an additional utterance from the user for a conversation including the utterance; and
  receiving the additional utterance from the user, wherein the boosting and the lowering is based at least in part on the additional utterance.

18. The system of claim 15, wherein the outputs of the machine learning model and the modified output of the tuned, output modifying function comprise respective confidence scores.

19. The system of claim 15, wherein the instructions upon execution cause the machine learning service to perform operations further comprising:
  receiving a request to retune the function from the user;
  performing, in response to the request to retune the function, a second training iteration of the function, on an output of the machine learning model for an input of one or more training documents, to generate an updated tuned, output modifying function without performing an additional training iteration of the machine learning model;
  receiving a second inference request for a second utterance of the user;
  generating, by the machine learning model, an output based at least in part on the second utterance;
  applying the updated tuned, output modifying function to the output based at least in part on the second utterance from the machine learning model to generate a second modified output;
  generating a second inference based at least in part on the second modified output; and
  transmitting the second inference to the client application or to the storage location.

20. The system of claim 15, wherein the instructions upon execution cause the machine learning service to perform operations further comprising, wherein the performing the training iteration of the function comprises tuning the calibration parameters of the function to optimize a loss function for in domain and out of domain intent classification for the user.

* * * * *